J. W. Swickard.
Excavator.
No. 92,224. Patented July 6. 1869.

Witnesses:
J. B. Harsh
Platt R. Richards

Inventor:
Jno. W. Swickard,
per W. B. Richards, Atty.

United States Patent Office.

JOHN W. SWICKARD, OF GALVA, ASSIGNOR TO HIMSELF AND WILLIAM H. HOWELL, OF ALTONA, ILLINOIS.

Letters Patent No. 92,224, dated July 6, 1869.

IMPROVED EXCAVATOR.

The Schedule referred to in these Letters Patent and making part of the same.

To all whom it may concern:

Be it known that I, JOHN W. SWICKARD, of Galva, in the county of Henry, and State of Illinois, have invented certain new and useful Improvements in Excavators; and I do hereby declare that the following is a full, clear, and exact description of the same, reference being had to the accompanying drawings, making a portion of this specification, in which—

Figure 1:
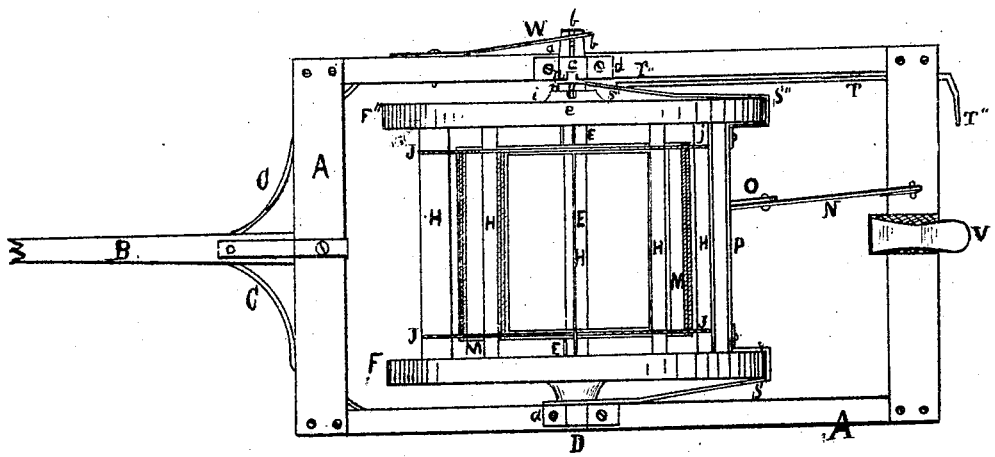
Figure 2:
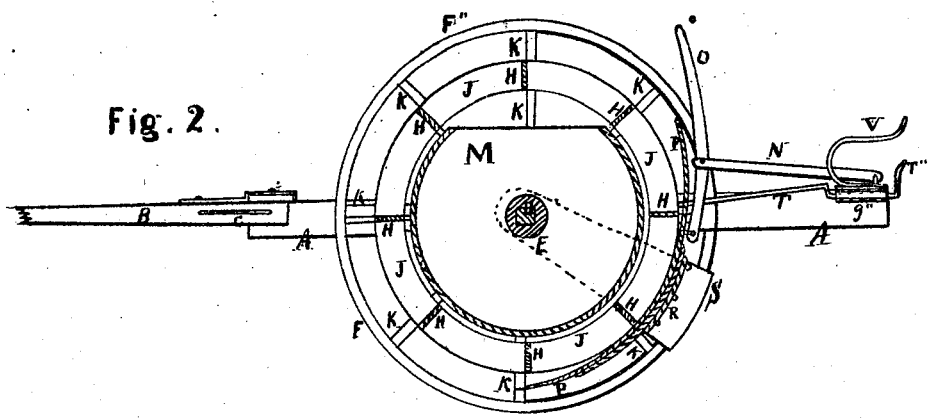

Figure 1 is a top view.
Figure 2 is a vertical longitudinal central sectional view.

Similar letters of reference indicate corresponding parts in both figures.

The nature of this invention relates to improvements in excavators; and

The invention consists in a suitable frame, mounted on two wheels, and carrying the dirt-box on the axle, and the shovel in the rear, suspended by oscillating arms from the axle, the wheels being provided with arms and guides, which, passing up between the dirt-box and shovels, serve to elevate the dirt, as excavated, and deposit it in the dirt-box.

It also consists in suitable mechanism for throwing the wheels in gear with the axle, for the purpose of revolving and emptying the dirt-box.

To enable others to understand the construction and operation of my invention, I will proceed to describe it with reference to the drawings.

A represents a rectangular frame, of which B is the draught-pole, and C C are stays or braces.

D represents the axle, supported in suitable bearings in the side pieces of the frame A.

M represents the dirt-box, which may be cylindrical, as represented in the drawings, or it may be semi-cylindrical, or square, or triangular, with the hind side cylindrical, and is attached solid to the axle D, by means of the square hole in the cylinder E.

F represents the wheels, which support the frame A, and run on suitable spindles on the axle D.

K represents the arms or spokes of the wheels F; and

H represents flat bars, passing from the arm of one wheel to the corresponding arm of the other, said bars being so placed on the arms K, that they may nearly touch the dirt-box on the rear side, in revolving the wheels F, and to act as sweeps in carrying the loosened dirt up to the dirt-box M.

P represents the shovel or plow, curved longitudinally, nearly corresponding with the circle described by the bars H, in revolving.

This shovel may be formed of any suitable material, and steel-pointed, and may be strengthened by ribs R, bolted or riveted thereon.

J represents guards, so placed on the bars H, as to prevent the dirt from falling off at the sides of the shovel, in passing up to the receiving-box.

S represents arms, pivoted on the axle D, at the forward end, and carrying the shovel P at the rear end.

N represents a lever, pivoted to the main frame, at one end, and at the other to the lever O; the lever O being pivoted to the shovel P.

V represents the seat-board.

a represents a slide, seated in a slot in the axle D, and carrying the pair of tongues or clutches b b, on the outer end, and the tongues or clutches n n, on the other end, or between the frame A and the hub of the wheel F.

W represents a spring, attached, at one end, to the main frame, and the other end operating between the clutches b b, serves to draw the slide a outward, so that the inner clutch n may catch in the notch c in the boxing d, and hold the axle from turning with the wheels.

T represents a lever, attached to the main frame by the journal g", and having a crank-shaped handle, T", at the back end, and an eye, r", at the forward end.

By pressing on the handle T, the eye r" will in turn bear against the forward end of the arm S", which in turn will bear against the clutch n, and throw it into one of the notches e in the hub of the wheel F". The clutch n" being at the same time withdrawn from the notch c, will allow the axle to revolve with the wheels F; and the dirt-box M being carried over with the axle D, may be emptied of its contents, and when the mouth of the dirt-box again comes up to the desired position, by taking the hand and pressure off of the crank T, the spring W will immediately throw the clutch n" again into the notch c, and hold the dirt-box firmly, while the wheels F revolve on the axle D.

By drawing with the hand on the lever O, the shovel P may be elevated, whenever desirable, and the device for elevating it, it will be seen, tends to withdraw the shovel from the dirt in the easiest direction, and not, as in all other machines, to lift or force it up through the unbroken ground, often immediately over it.

I contemplate adding to this machine a loose gear, for disconnecting the wheels when turning, and connecting again when moved forward.

What I claim as my invention, and desire to secure by Letters Patent, is—

1. The longitudinally-curved shovel P, when suspended by oscillating arms S, from the axle D, and combined with the dirt-box M, substantially as and for the purpose set forth.

2. The combination and arrangement of bars H, guards K, wheels F, and shovel P, for carrying up the dirt, substantially as described.

3. The arrangement of lever T, arm S", slide a, with clutches b b and n" n, and notches c and e, spring W, and axle D, substantially as described and for the purpose set forth.

JOHN W. SWICKARD.

Witnesses:
G. L. FOSTER,
O. W. NEGUS.